United States Patent
Jennissen

(10) Patent No.: US 11,572,597 B2
(45) Date of Patent: Feb. 7, 2023

(54) P PROCESS OF MAKING PIG IRON IN A BLAST FURNACE USING PELLETS CONTAINING THERMOPLASTIC AND CELLULOSIC MATERIALS

(71) Applicant: SUBCOAL INTERNATIONAL B.V., Bergen (NL)

(72) Inventor: Lars Jennissen, Nieuw Bergen (NL)

(73) Assignee: Subcoal International B.V., Nieuw Bergen (NL)

( * ) Notice: Subject to any disclaimer, the term of this patent is extended or adjusted under 35 U.S.C. 154(b) by 356 days.

(21) Appl. No.: 16/624,345

(22) PCT Filed: Jun. 19, 2018

(86) PCT No.: PCT/EP2018/066232
§ 371 (c)(1),
(2) Date: Dec. 19, 2019

(87) PCT Pub. No.: WO2018/234300
PCT Pub. Date: Dec. 27, 2018

(65) Prior Publication Data
US 2020/0347468 A1    Nov. 5, 2020

(30) Foreign Application Priority Data
Jun. 19, 2017   (EP) .................................. 17176660

(51) Int. Cl.
*C21B 5/02* (2006.01)
*C21B 5/00* (2006.01)
(Continued)

(52) U.S. Cl.
CPC .............. *C21B 5/026* (2013.01); *C21B 5/008* (2013.01); *C21B 5/06* (2013.01); *C21B 7/16* (2013.01); *C21B 2300/02* (2013.01)

(58) Field of Classification Search
CPC .......... C21B 5/026; C21B 5/008; C21B 5/06; C21B 7/16; C21B 2300/02; C21B 5/00; C10L 5/363
(Continued)

(56) References Cited

U.S. PATENT DOCUMENTS

| | | | | |
|---|---|---|---|---|
| 6,635,093 B1 * | 10/2003 | Schoen | ................. | B30B 11/201 44/553 |
| 2011/0023657 A1 * | 2/2011 | Ibaraki | ..................... | C22B 5/10 75/369 |
| 2016/0208349 A1 * | 7/2016 | Fujiwara | ................... | F27B 1/16 |

FOREIGN PATENT DOCUMENTS

| | | |
|---|---|---|
| EP | 1236790 A1 | 9/2002 |
| JP | 2006233332 A | 9/2006 |

(Continued)

OTHER PUBLICATIONS

Definition of "together" (Year: 2021).*

*Primary Examiner* — Brian D Walck
*Assistant Examiner* — Danielle Carda
(74) *Attorney, Agent, or Firm* — David Philip Owen; Hoyng Rokh Monegier B.V.

(57) ABSTRACT

The use of pellets comprising one or more thermoplastic material(s) of more than 40%, based on the total dry weight of the pellets and one or more cellulosic material(s) of more than 20%, based on the total dry weight of the pellets, as a reducing agent in a process for making pig iron in a blast furnace. The pellets can be provided in unground form, as a partial replacement of coke through the top of the blast furnace, or can be provided as reducing agent in the raceway in an amount of higher than 10 kg/ton iron.

16 Claims, 1 Drawing Sheet

(51) Int. Cl.
*C21B 5/06* (2006.01)
*C21B 7/16* (2006.01)

(58) Field of Classification Search
USPC .......................................................... 75/460
See application file for complete search history.

(56) References Cited

FOREIGN PATENT DOCUMENTS

JP    2009068088 A    4/2009
WO    2015155193 A1    10/2015

* cited by examiner

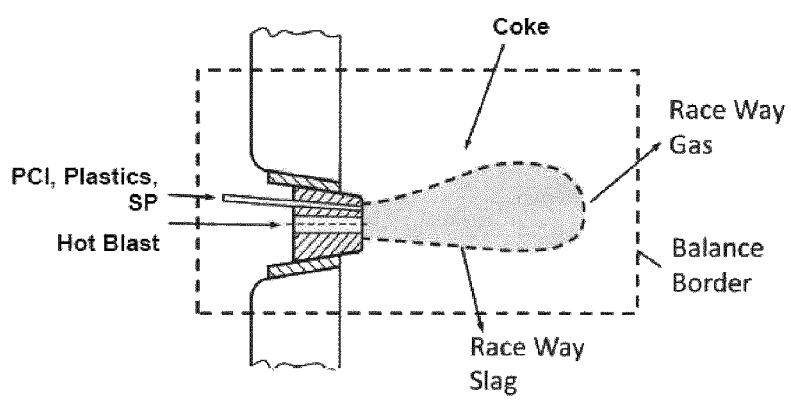

P PROCESS OF MAKING PIG IRON IN A BLAST FURNACE USING PELLETS CONTAINING THERMOPLASTIC AND CELLULOSIC MATERIALS

TECHNICAL FIELD

The invention relates to a process for making pig iron in a blast furnace.

BACKGROUND ART

The blast furnace (BF) process is the most common means of producing crude metal, also called pig iron. Inside the massive cylindrical structure of the BF, coke may be used as a source of heat and as a reducing agent in melting iron ore.

The iron ore and coke can be loaded into the blast furnace from the top in alternate layers, and hot air is fed from tuyeres at the base of the furnace into the furnace to generate carbon monoxide gas from the coke. The heat of this reaction and the carbon monoxide are being used to reduce and melt the iron ore. The pig iron and slag thus produced are removed at intervals via an outlet at the base of the furnace.

Blast furnace coke is a key material for BF ironmaking, acting as a major energy source (fuel), a reductant, a carburization agent and a permeable structural support. Coke rate is the parameter for the consumption of BF coke which is measured in kilograms of BF coke consumed per ton of hot metal produced. An efficient blast furnace operates at a low coke rate.

Injection of auxiliary reducing agents has been within the last two decades a way to decrease the coke rate, see for example JP-A-2006/233332.

Currently, steel companies generally inject pulverized coal at the level of the tuyeres of the blast furnace. The so named Pulverized Coal Injection (PCI) is a process based on the concept of primary air (termed the "conveying gas") carrying pulverized coal which can be injected through a lance to the tuyere (mid-bottom inlet of a blast furnace), then mixed with secondary hot air (termed the "blast") supplied through a blowpipe in the tuyere and then piped to a furnace to create a balloon-like cavity called a "raceway", which then propagates coal and coke combustion and melts the solid iron ore, releasing molten iron. The flame temperatures in the combustion zone, i.e. raceway, are in general 2000-2300° C. when operating with pulverized coal injection (PCI).

For an optimal blast furnace operation using PCI, it is a necessary requirement to ensure nearly the whole content of injected coal is gasified as fast as possible and best as possible within the tuyere and raceway; otherwise it could negatively affect the permeability of the BF. The amount of coal that can be injected depends on the coal and coke quality, furnace geometry, and operational practices. Furthermore, the pulverized coals have a low bulk density and bad storage characteristics. A main disadvantage of pulverized coal is the fact that it is from a non-renewable source.

Pulverized coal is not the only reducing agent used at the blast furnace. Waste plastics of different origin may be used in place of coke and pulverized coal. The injected plastic is broken down to form reducer gas ($CO+H_2$) which rises through the raw materials in the furnace and reacts with the iron ore. When plastics are used hydrogen contributes to the reduction reaction. One advantage of using plastics generally is that they have a low thermal conductivity and the heat transfer rate in a raceway is extremely high.

Examples of such use is for example described in U.S. Pat. Nos. 5,772,727 and 6,230,634, JP-A-2009/068088 and EP-A-1236790.

A disadvantage of using waste plastics is that such mixtures originating, for example, from domestic, urban or municipal waste are relatively valuable products that can be used to make (recycled) plastic products. A further disadvantage is, that despite a high calorific value, the waste plastic pellets are less efficient than pulverized coal in reducing iron oxide to iron in the sense of keeping the required temperature in the raceway, and the required amount of reducing agent.

The delivery of waste plastics into a furnace may vary depending upon the nature of the waste material and the type of furnace being supplied. There are three ways to use waste plastics in iron making technologies: gasification and subsequent injection of generated reducing gas; embedding in raw materials (self-reducing pellets, composites, coal blend for coke making, fuel for sintering); direct use by injection via or at the level of the tuyeres. In the latter, the solid plastics undergo mechanical or/and thermal processing and be further recovered in the form of agglomerates, granulates, pellets, etc. which are then reduced (pulverized) to a required particle size in a shredder and then employed into the furnace (Babich et al. Use of charcoal, biomass and waste plastics for reducing $CO_2$ emission in ironmaking in Proceedings/METEC InSteelCon 2011 Düsseldorf, Germany, Düsseldorf).

DE-A-2935544 describes the use of all sorts of comminuted waste and biomass as replacement of PCI in a blast furnace.

WO 2008/107042 teaches that cellulose/plastic waste can be used in a blast furnace when comminuted. The cellulose fraction of the fuel is $CO_2$ neutral and therefore helps to reduce $CO_2$ emissions by these furnaces. WO 2015/155193 describes co-grinding of pellets with coal for firing an industrial furnace, in particular for electricity generation.

The alternative wastes have issues with transport, storage, and processing, and are not used in practice.

There is thus a need in the field for a process in which another reducing agent can be supplied into a blast furnace preferably with higher efficiency than plastic waste, and thereby allowing relative large amounts of waste to be used per ton of iron.

SUMMARY OF THE INVENTION

The present invention was made in view of the prior art described above, and the object of the present invention is to provide a process of making steel, or pig iron in a blast furnace with a reducing agent with a better efficiency than with plastic waste.

The invention relates to the use of pellets comprising one or more thermoplastic material(s) of more than 40%, based on the total dry weight of the pellets and one or more cellulosic material(s) of more than 20%, based on the total dry weight of the pellets, as a reducing agent in a process for making pig iron in a blast furnace.

The process of making pig iron in a blast furnace according the invention comprises the steps of:
a) charging the blast furnace with an iron ore and coke;
b) injecting a reducing agent into the blast furnace at the level of one or more tuyeres in the raceway of the blast furnace;
c) feeding hot air in the raceway of the blast furnace, wherein the blast furnace is furthermore charged with pellets in unground form, as a reducing and energy supply agent in an amount of higher than 10 kg/ton iron, said pellets comprising:

one or more thermoplastic material(s) of more than 40 weight %, based on the total dry weight of the pellets; and one or more cellulosic material(s) of more than 20 weight %, based on the total dry weight of the pellets d) and obtaining pig iron at the bottom of the blast furnace.

In one embodiment, the invention the pellets are provided in the top feed together with the iron ore and coke as partial replacement of coke.

In another embodiment, which can be combined with the first embodiment, said reducing agent of step (b) comprises said pellets An aim of the present invention is to provide an improved process of the BF when using waste material as reducing agent. The aim of this invention is met by utilizing a reducing agent comprising cellulosic and thermoplastic material supplied into the BF in form of pellets without these being grinded in an amount of more than 20 kg/ton iron. By directly supplying the pellets to a blast furnace there is no need for an additional pulverizing unit prior to the supply into the BF.

It was unexpected that using pellets having a lower calorific value than full plastic pellets, a blast furnace could be operated more efficiently than when using full plastic pellets. In particular, it is shown that an increased amount of reducing gas is obtained from the pellets according the inventions. It is also shown that the temperature in the raceway is influenced less than with full plastic pellets The pellets have advantageous properties over powder or agglomerates because of good bulk, storage and transport, and better dosing properties. In particular, the spherical shape and open pores of pellets gives better and uniform permeability resulting in smoother furnace operation and faster reduction. The pellets have very high cold crushing strength resulting in negligible generation of fines in stock house and good resistance to disintegration during transport.

In contrast to full plastic waste pellets, which can be used to produce products as such from the recycled plastics, the plastic/cellulosic mixtures of the pellets for use in the invention cannot be used as such for the production of products. Hence, recycling through the manufacture if pig iron appears an economically and technically attractive method and solves waste issues with e.g. landfill.

Further benefits and advantages of the present invention will become apparent in the detailed description with appropriate reference to the accompanying drawings.

BRIEF DESCRIPTION OF THE DRAWINGS

FIG. 1 illustrates a balance area at raceway in a blast furnace.

DETAILED DESCRIPTION

The descriptions below are intended to be illustrative and are in no event to be considered as limiting. It will be apparent to the person skilled in the art that alternative and equivalent embodiments of the invention can be conceived and reduced in practice, without departing from the scope of the claims set out below.

One embodiment of the invention relates to the use of pellets comprising one or more thermoplastic material(s) of more than 40%, based on the total dry weight of the pellets and one or more cellulosic material(s) of more than 20%, based on the total dry weight of the pellets, as a reducing agent in a process for making pig iron in a blast furnace.

In a further embodiment of the present invention there is provided a process of making pig iron in a blast furnace, said process comprising the steps of:

a. charging the blast furnace with an iron ore and coke;

b. injecting a reducing agent into the blast furnace at the level of one or more tuyeres in the raceway of the blast furnace;

c. feeding hot air in the raceway of the blast furnace; and wherein the blast furnace is furthermore charged with pellets in unground form as a reducing and energy supply agent in an amount of higher than 10 kg/ton iron, said pellets comprising:

one or more thermoplastic material(s) of more than 40%, based on the total dry weight of the pellets; and one or more cellulosic material(s) of more than 20%, based on the total dry weight of the pellets.

In a preferred embodiment, said pellets are provided as a partial replacement of coke through the top of the blast furnace.

In another preferred embodiment, which can be combined with other preferred embodiments, said pellets are provided as reducing agent in step (b).

The term "blast furnace" relates to a blast furnace of any geometry.

By the term "thermoplastic material" is meant thermoplastic polymers. The thermoplastic material of the present invention comprises at least 40% thermoplastic material, preferably at least 45 weight % or at least 50 weight % thermoplastic material, like for example about 55 weight % or about 60 weight % thermoplastic material.

Generally, the amount of plastic material in the pellets is about 80% or less, preferably 70% or less. Hence, suitable ranges comprise 40-80 wt % of plastic, or 50-70 wt % of plastic. In some embodiments, the amount of plastic can be between 55-80 wt %, more preferably 55-70 wt %.

Examples of thermoplastic polymers used herein are listed in US 2010/0116181. Typically, the thermoplastic material or component may be a packing material or any type of plastic waste.

Preferably, at least 20 weight %, more preferably at least 40 weight %, even more preferably at least 50 weight %, and most preferably at least 60 weight % of the thermoplastic material are polyethylene homo- or copolymers.

The term "cellulosic material" used in the present invention relates to for example paper, carton, wood, cardboards, textiles such as cotton, rayon and/or viscose. The cellulosic material of the present invention comprises at least 20 weight % of cellulosic material, preferably more than 25 weight % or more than 30 weight % cellulosic material. Generally, the amount of cellulosic material is about 60 wt % or less, preferably about 50 wt % or less cellulosic material based on the total dry weight of the pellets. Suitable ranges include 20-60 wt % cellulosic material, preferably 30-50 wt % cellulosic material. More preferably, the amount of cellulosic material is between 20-45 wt %, even more preferably between 30-45 wt %. Cellulosic material can also be denoted as biomass.

As the pellets are made from selected waste materials, generally some inert materials are present, like for example between 3-10 wt %. Hence, suitable pellets may contain about 45 wt % cellulosic material (biomass), about 50 wt % plastic and about 5 wt % inert materials. Suitable pellets are therefore comprising between 50-70 wt % plastic, and 30-45 wt % cellulosic material, and further 5-10 wt % inert materials.

As used herein, the term "pellet" or "pellets" is used when referring to pellets of the present invention comprising one or more thermoplastic material(s) and one or more cellulosic material(s). The pellets are not limited by a degree of inhomogeneity. The pellets the present invention may be the commercially available Subcoal® pellets (SP).

Suitable processes to make pellets are described in the art, as for example in U.S. Pat. No. 6,635,093.

Pellets have a uniform size range (diameter) generally within a range of 6-20 mm. The length of the pellets generally will be between 4 and 50 mm.

The heating value or calorific value or calorific heating value of any fuel is the energy released per unit mass or per unit volume of the fuel when the fuel is completely burnt. The quantity is determined by bringing all the products of combustion back to the original pre-combustion temperature, and in particular condensing any vapor produced. With other words, it is the amount of heat released during the complete combustion of a specified amount of it.

Calorimetry measures the higher heating value (HHV) and uses the following procedure. It fully combusts the sample using pure oxygen and then produces carbon dioxide and water. The water is initially produced as a vapor. However, once the entire sample is combusted (i.e., the test is complete) the water vapor condenses. This condensation process releases additional heat. Technically this additional heat is latent heat from the conversion of water from a vapor to a liquid phase. The combination of the heat released during the combustion of the sample and the subsequent heat released during the conversion of water vapor to liquid provides the maximum heat that can be obtained. This is known as Higher calorific value (HCV) or Higher heating value (HHV).

If the process maintains the water produced in the vapor state then the latent heat is not recovered. This is known as the Lower calorific value (LCV) or Lower heating value (LHV). The LHV is only the heat of combustion and does not include the heat released during condensation of the water vapor. LHV is the key measurement for most combustion systems that convert heat to power or energy.

The HHV and LHV are valid for complete combustion of the fuel to $CO_2$ and $H_2O$. The calorific heating value of a substance in the raceway of a blast furnace is determined by the high carbon activity of the coke. Consequently a complete oxidation of a fuel to $CO_2$ and $H_2O$ is not possible. The most stable oxide under this condition is CO. For this condition the heating value for incomplete combustion HVIC is suitable. The incomplete combustion equation of a fuel component containing C, H, O and N in the raceway is given as follows:

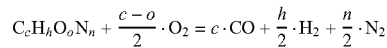

$$C_cH_hO_oN_n + \frac{c-o}{2} \cdot O_2 = c \cdot CO + \frac{h}{2} \cdot H_2 + \frac{n}{2} \cdot N_2$$

in which the lower case c, h, o and n denote the relative amount of the respective elements in the formula It has been found that the pellets of the present invention have a higher substitution rate of coke than (waste) plastics. The important factor for this is the difference in the heating value of incomplete combustion (HVIC) which determines the flame temperature. Yet, another factor is the composition of the reducing agent, and in particular the amount of hydrogen and oxygen.

The calorific value (LCV) of the pellets is generally about 22-28 GJ/ton, which is lower than full plastic material, which generally has a calorific value of 31-35 GJ/ton (on dry weight).

Yet, the pellets generally have a heating value for incomplete combustion higher than full plastic materials.

In a preferable embodiment, the inventors found that the process can use pellets having a heating value for incomplete combustion (HVIC) in the range of about 6 to about 7 MJ/kg. Full plastic material generally has a HVIC lower than about 6 MJ/kg.

The pellets are blown into the raceway of a blast furnace at an adiabatic flame temperature in the range of about 1900° C. to about 2500° C. and air volume in the range of 1280-2000 $Nm^3/kg*1000$.

A further aspect of the invention concerns the process wherein the oxygen content of the pellets is in the range of 20 to 30 w % of the dry weight pellets.

A further aspect of the invention concerns the process wherein the hydrogen content of the pellets is in the range of 6 to 8 w % of the dry weight pellets.

A further object of the invention is to provide a process wherein an amount of pellets is used, which is higher than 10 kg pellets per ton of metal (pig iron). Generally, the amount will be in the range of 10-250 kg pellets per ton of hot metal. Preferred amounts are more than 12 kg/ton, and even more preferable more than 15 kg/ton metal. Preferably about 20-250 kg pellets per ton of metal, and even more preferably 20-200 kg pellets per ton of metal is used. In another embodiment, the preferred range is 25-250 kg pellets per ton of hot metal.

Another aspect is the process wherein the pellets comprise 1 to 10 weight % of moisture.

Certain elements which may enter the blast furnace by different sources, have a negative influence on the operation of the blast furnace. Heavy metals such as zinc, lead, cadmium and mercury occur in very low concentrations in the different input materials compared to the main elements such as iron. Another group of elements which are considered as critical for the operation are the alkali metals potassium and sodium. These elements can also form similar to zinc and lead an internal cycle in the blast furnace. This alkali enrichment leads to the formation of build-up at the furnace wall and attacks the refractory materials. These build-ups are mainly formed in interaction with carbon and zinc. The halogen elements like chlorine and fluorine are also critical elements. High input of this elements leads to corrosion in the dry and wet gas cleaning system and in addition to chlorine and fluorine emission with the drain water of the top gas scrubber.

The pelletized material according the invention, in particular the pellets made of the of the materials as described, is suitable for use as reducing agent, and as energy source in a blast furnace in unground form.

Examples

Hereinafter, the present invention is described in more detailed and specifically with reference to the Examples, which however are not intended to limit the present invention.

Table 1 contains the chemical analysis and the heating values LCV, HCV and HVIC of pure carbon, pure hydrogen, pure carbon monoxide, and the pulverized injection coal (PCI coal), waste plastics (WP) and Subcoal® pellets (SP). These results show that the ranking of fuels according to LCV and HCV does not correlate with the ranking of the fuels according to the HVIC and that SP has a higher HVIC tan full plastic pellets.

TABLE 1

Chemical analysis and the heating values LCV, HCV and HVIC of the fuels pure carbon, pure hydrogen, pure carbon monoxide, pulverized injection coal (PCI coal), waste plastics (WP) and Subcoal pellets (SP).

| Fuel (w % dry weight) | Carbon (C) | Hydrogen ($H_2$) | Carbon monoxide (CO) | Methane ($CH_4$) | PCI-coal | Waste plastics (WP) | Subcoal pellets (SP) |
|---|---|---|---|---|---|---|---|
| C | 100.0 | 0.0 | 42.9 | 74.9 | 81.1 | 73.0 | 51.8 |
| H | 0.0 | 100.0 | 0.0 | 25.1 | 4.1 | 9.0 | 7.3 |
| O | 0.0 | 0.0 | 57.1 | 0.0 | 2.0 | 10.0 | 27.2 |
| N | 0.0 | 0.0 | 0.0 | 0.0 | 2.1 | 0.5 | 0.5 |
| Water | 0.0 | 0.0 | 0.0 | 0.0 | 0.7 | 1.0 | 3.8 |
| Ash | 0.0 | 0.0 | 0.0 | 0.0 | 10.7 | 6.0 | 9.4 |
| LCV kJ/kg | 32,763 | 119,960 | 10,102 | 50,027 | 31,489 | 33,746 | 27,900 |
| HCV kJ/kg | 32,763 | 141,789 | 10,102 | 55,513 | 31,384 | 35,865 | 29,494 |
| HVIC kJ/kg | 9,204 | 0 | 0 | 2,240 | 7,464 | 5,751 | 6,939 |

A mass and energy balance model has been established to calculate the theoretical flame temperature and the change of the specific coke rate for different Test cases.

FIG. 1 illustrates a balance raceway according to the invention. Here, gaseous components of the raceway gas are CO, $H_2$ and $N_2$. Components of the raceway slag are metallic oxides (no reduction of oxides to metals is considered in the balance). The temperature of the raceway gas and the raceway slag is the same and it represents the theoretical flame temperature (see the description below). Additionally, the hot blast temperature is 1200° C., the coke temperature is 1600° C., the PCI temperature is 70° C., and the plastics and SP temperature is about 20° C.

Table 2 contains the parameters which were varied for the cases which are conducted in the tuyere of the blast furnace. The Comparative A case is used for the evaluation of the theoretical flame temperature and coke consumption in the raceway without any additive in the raceway. In comparative test B, powdered coal is used, which reflects the processing of a blast furnace in a conventional way. Comparative experiment C reflects about the maximum amount of waste plastic that can be used without lowering the flame temperature significantly. Comparative experiment D reflects a normal case, where powdered coal is combined with plastic pellets, to achieve a reduction in coal, while keeping a suitable raceway temperature. Experiments I-IV according the invention represent cases for the operation of a blast furnace. Experiment I and II are respectively 75%/25% and 50/50 mixture of SP and PCI. Experiment III uses a total injection of 180 kg of SP. Experiment IV is an operation with PCI (140), plastic waste (20) and SP (7.8).

TABLE 2

Parameters of the calculated experiments.

| Experiment | PCI rate (kg/t hot metal) | Waste plastics rate (kg/t hot metal) | SP rate (kg/t hot metal) | $O_2$ content in blast (vol %) |
|---|---|---|---|---|
| A | 0 | 0 | 0 | 21 |
| B | 180 | 0 | 0 | 27 |
| C | 0 | 120 | 0 | 27 |
| D | 140 | 40 | 0 | 27 |
| I | 135 | 0 | 45 | 27 |
| II | 90 | 0 | 90 | 27 |
| III | 0 | 0 | 180 | 27 |
| IV | 140 | 20 | 7.8 | 27 |

The following Table 3 shows the analysis of the experiment.

The change of the specific coke rate in the raceway in comparison to the comparative experiment A (without additional reducing agent in the raceway) is shown in Table 3. The use of powdered coal allows the reduction of the coke rate of nearly 50%. The maximum amount of plastic waste (120 kg/hr) allows for a reduction, but the flame temperature is close to the lower boundary of 2100. A decent process can be performed with case D, 140 kg/hr PCI and 40 kg/hr plastic waste. Example I is largely comparable with Experiment D, and shows that the use of the pellets of the invention allow for a higher temperature in the raceway, which is a distinct advantage. Examples II and III show that stable processing is possible, even with substantially larger amounts of SP. Example IV shows that with lower amounts, and/or mixtures with plastic waste, flawless operation is possible.

TABLE 3

Calculated coke consumption of the different test cases and calculated temperature of the raceway.

| | A | B | C | D | I | II | III | IV |
|---|---|---|---|---|---|---|---|---|
| Coke rate per tuyere (kg/hour) | 2215 | 1134 | 1836 | 1220 | 1344 | 1553 | 1971 | 1304 |
| Specific coke rate (kg/t hot metal) | 221 | 113 | 184 | 122 | 134 | 156 | 197 | 130 |
| Change of specific coke rate (kg/t hot metal) | 0 | −108 | −37 | −99 | −87 | −65 | −24 | −91 |
| Increase to comp exp A | 0% | −49% | −17% | −45% | −39% | −29% | −11% | −41% |
| Theoretical flame temperature | 2374 | 2212 | 2136 | 2153 | 2179 | 2148 | 2088 | 2197 |

The invention claimed is:

1. Process of making pig iron in a blast furnace having a raceway, said process comprising the steps of:
 a) charging the blast furnace with a top feed comprising an iron ore and coke;
 b) injecting a reducing agent into the blast furnace at the level of one or more tuyeres in the raceway of the blast furnace;

c) feeding hot air in the raceway of the blast furnace, wherein the blast furnace is furthermore charged with pellets in unground form as a reducing and energy supply agent in an amount of higher than 10 kg/ton iron, said pellets comprising:
one or more thermoplastic material(s) of more than 40 weight %, based on the total dry weight of the pellets; and
one or more cellulosic material(s) of more than 20 weight %, based on the total dry weight of the pellets
d) and obtaining pig iron at the bottom of the blast furnace.

2. Process according to claim 1, wherein the pellets are provided in the top feed together with the iron ore and coke as partial replacement of coke.

3. Process according to claim 1, wherein said reducing agent in step (b) comprises said pellets.

4. The process according to claim 3, wherein the pellets are having a heating value for incomplete combustion (HVIC) calculated with the formula:

$$C_cH_hO_oN_n + \frac{c-o}{2} \cdot O_2 = c \cdot CO + \frac{h}{2} \cdot H_2 + \frac{n}{2} \cdot N_2$$

in the range of about 6 to about 7 MJ/kg;
and wherein the pellets are having a calorific value (LCV) of 22-28 GJ/ton.

5. The process according to claim 1, wherein the pellets are having a heating value for incomplete combustion (HVIC) calculated with the formula:

$$C_cH_hO_oN_n + \frac{c-o}{2} \cdot O_2 = c \cdot CO + \frac{h}{2} \cdot H_2 + \frac{n}{2} \cdot N_2$$

in the range of about 6 to about 7 MJ/kg.

6. The process according to claim 1 wherein the oxygen content of the pellets is in the range of 20 to 30 wt % of the dry weight pellets.

7. The process according to claim 1, wherein the hydrogen content of the pellets is in the range of 7 to 8 wt % of the dry weight pellets.

8. The process according to claim 1, wherein the pellets have a calorific value (LCV) of 22-28 GJ/ton.

9. The process according to claim 1, wherein an amount of pellets is used of more than 12 kg/ton metal.

10. The process according to claim 9, wherein an amount of pellets used is about 50-200 kg pellets per ton of hot metal.

11. The process according to claim 1, wherein the pellets comprise:
one or more thermoplastic material(s) in an amount of 40-70 weight %, based on the total dry weight of the pellets; and
one or more cellulosic material(s) in an amount of 30-50 weight % based on the total dry weight of the pellets.

12. The process according to claim 1, wherein the pellets have a diameter of between 6 and 20 mm and a length of between 4 and 50 mm.

13. The process according to claim 1 wherein the raceway is held at an adiabatic flame temperature in the range of about 1900° C. to about 2500° C. and air volume in the range of 1280-2000 Nm³/kg*1000.

14. Process of making pig iron in a blast furnace, said said process comprising the steps of:
a) charging the blast furnace with an iron ore and coke;
b) injecting a reducing agent into the blast furnace at the level of one or more tuyeres in the raceway of the blast furnace;
c) feeding hot air in the raceway of the blast furnace, wherein the blast furnace is furthermore charged with pellets in unground form as a reducing and energy supply agent in an amount of higher than 10 kg/ton iron, said pellets comprising:
one or more thermoplastic material(s) of more than 40 weight %, based on the total dry weight of the pellets; and
one or more cellulosic material(s) of more than 20 weight %, based on the total dry weight of the pellets;
d) and obtaining pig iron at the bottom of the blast furnace;
wherein said reducing agent in step (b) comprises said pellets;
wherein the oxygen content of the pellets is in the range of 20 to 30 wt % of the dry weight pellets;
wherein the hydrogen content of the pellets is in the range of 7 to 8 wt % of the dry weight pellets;
wherein the pellets have a diameter of between 6 and 20 mm and a length of between 4 and 50 mm.

15. The process according to claim 14, wherein the pellets are having a heating value for incomplete combustion (HVIC) calculated with the formula:

$$C_cH_hO_oN_n + \frac{c-o}{2} \cdot O_2 = c \cdot CO + \frac{h}{2} \cdot H_2 + \frac{n}{2} \cdot N_2$$

in the range of about 6 to 7 MJ/kg.

16. The process according to claim 15, wherein the pellets are having a calorific value (LCV) of 22-28 GJ/ton.

* * * * *